United States Patent
Gum

(10) Patent No.: US 11,509,733 B2
(45) Date of Patent: Nov. 22, 2022

(54) DETERMINING A LOCATION CONTEXT OF A DEVICE

(71) Applicant: QUALCOMM Incorporated, San Diego, CA (US)

(72) Inventor: Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/002,543

(22) Filed: Aug. 25, 2020

(65) Prior Publication Data

US 2021/0067595 A1 Mar. 4, 2021

Related U.S. Application Data

(60) Provisional application No. 62/893,292, filed on Aug. 29, 2019.

(51) Int. Cl.
*H04L 67/52* (2022.01)
*H04W 4/029* (2018.01)
*H04W 4/02* (2018.01)
*G16Y 10/75* (2020.01)

(52) U.S. Cl.
CPC ............ *H04L 67/52* (2022.05); *H04W 4/023* (2013.01); *H04W 4/029* (2018.02); *G16Y 10/75* (2020.01)

(58) Field of Classification Search
CPC ........ H04L 67/18; H04W 4/029; H04W 4/023
USPC ...................................................... 455/456.1
See application file for complete search history.

(56) References Cited

U.S. PATENT DOCUMENTS

| | | | |
|---|---|---|---|
| 2016/0323159 A1* | 11/2016 | Leblanc | G06F 16/29 |
| 2019/0044826 A1* | 2/2019 | Flores Guerra | H04W 4/02 |

FOREIGN PATENT DOCUMENTS

WO 2016011433 A2 1/2016

OTHER PUBLICATIONS

Fekher K., et al., "A Survey of Localization Systems in Internet of Things", Mobile Networks and Applications, ACM, New York, NY, US, vol. 24, No. 3, Aug. 25, 2018 (Aug. 25, 2018), pp. 761-785, XP036792774, ISSN: 1383-469X, DOI: 10.1007/S11036-018-1090-3 [retrieved on Aug. 25, 2018] sections; abstract 6, sections 2.2, 2.3, 3, 3.3, 4, 5.2 figs. 1,6.

(Continued)

*Primary Examiner* — Ted M Wang
(74) *Attorney, Agent, or Firm* — Thien T. Nguyen

(57) ABSTRACT

Disclosed are a method and devices for determining a location context of a first device. The method includes receiving, at the first device, a wireless signal from a second device, determining a proximity of the first device to the second device based on the wireless signal, and determining an area inference based on characteristics of the second device and based on the determined proximity of the first device to the second device. The area inference includes a category of the area. The method also includes assigning an area label to the first device based on the area inference, and providing the area label to an application to enhance the performance of the application.

27 Claims, 6 Drawing Sheets

(56) References Cited

OTHER PUBLICATIONS

International Search Report and Written Opinion—PCT/US2020/048061—ISA/EPO—dated Nov. 6, 2020.
Xuyu W., et al., "DeepFi: Deep Learning for Indoor Fingerprinting Using Channel State Information", 2015 IEEE Wireless Communications and Networking Conference (WCNC), IEEE, Mar. 9, 2015 (Mar. 9, 2015), pp. 1666-1671, XP032786630, DOI: 10.1109/WCNC.2015.7127718 [retrieved on Jun. 17, 2015] the whole document.

* cited by examiner

DETERMINING A LOCATION CONTEXT OF A DEVICE

CROSS-REFERENCE TO RELATED APPLICATIONS

This application claims priority to U.S. Provisional Application No. 62/893,292, filed on Aug. 29, 2019, entitled "DETERMINING A LOCATION CONTEXT OF A DEVICE", which is incorporated by reference in its entirety herein.

FIELD

This disclosure relates generally to wireless communication devices, and more specifically, to determining a location context of a device.

BACKGROUND

People generally spend a significant amount of time indoors, such as at home, at school, or in an office building. A person's location indoors may affect a number of thoughts, needs, and desires of that person. For example, a person who is located in a kitchen of a house may be focused on cooking activities. Similarly, a person who is located in an office of an office building may be focused on work activities. Knowledge of a person's location context can facilitate meeting that person's needs and desires in a more efficient and effective manner.

SUMMARY

In one aspect, a method of determining a location context of a first device includes receiving, at the first device, a wireless signal from a second device, determining a proximity of the first device to the second device based on the wireless signal, and determining an area inference based on characteristics of the second device and based on the determined proximity of the first device to the second device. The area inference includes a category of the area. The method also includes assigning an area label to the first device based on the area inference, and providing the area label to an application to enhance the performance of the application.

In another aspect, a first device includes a transceiver configured to receive a wireless signal from a second device, and a processor coupled to the transceiver. The processor is configured to determine a proximity of the first device to the second device based on the wireless signal and determine an area inference based on characteristics of the second device and based on the determined proximity of the first device to the second device. The area inference includes a category of the area. The processor is also configured to assign an area label to the first device based on the area inference, and provide the area label to an application to enhance the performance of the application.

In another aspect, a first device includes means for receiving a wireless signal from a second device, means for determining a proximity of the first device to the second device based on the wireless signal, and means for determining an area inference based on characteristics of the second device and based on the determined proximity of the first device to the second device. The area inference includes a category of the area. The first device also includes means for assigning an area label to the first device based on the area inference, and means for providing the area label to an application to enhance the performance of the application.

In yet another aspect, a non-transitory computer-readable medium includes processor-executable program code, that when executed by a processor, cause the processor to receive, at the first device, a wireless signal from a second device, determine a proximity of the first device to the second device based on the wireless signal, and determine an area inference based on characteristics of the second device and based on the determined proximity of the first device to the second device. The area inference includes a category of the area. When the instructions are executed by the processor, the processor is also configured to assign an area label to the first device based on the area inference, and provide the area label to an application to enhance the performance of the application.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
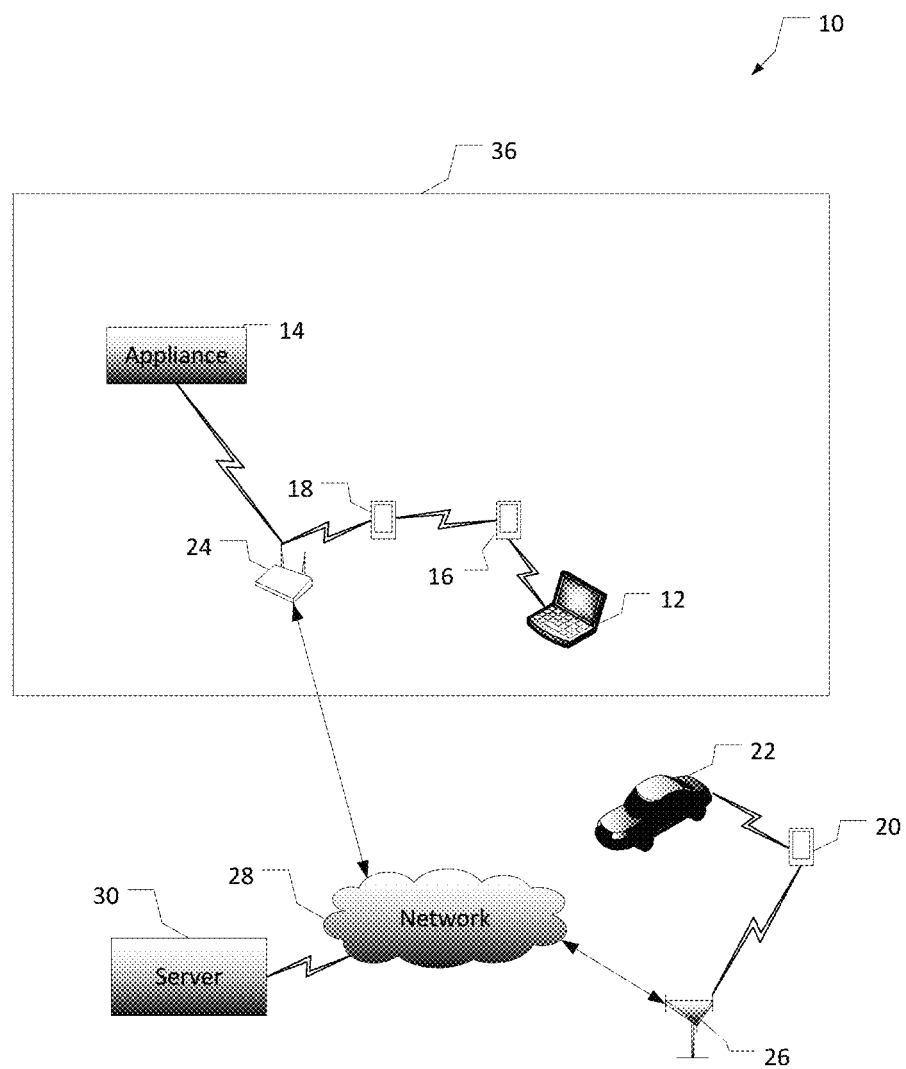
FIG. 1 is a block diagram of an example system that may include a plurality of devices.

References throughout this specification to one implementation, an implementation, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

The features and advantages of the disclosed method and apparatus will become more apparent to those skilled in the art after considering the following detailed description in connection with the accompanying drawings.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, a media access control (MAC) address, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of characteristics (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, stoves, microwaves, grills, rice cookers, juicers, freezers, dishwashers, dishes, hand tools, clothes washers, clothes dryers, water heaters, furnaces, air conditioners, thermostats, televisions, light fixtures, vacuum cleaners, sprinklers, electricity meters, gas meters, photo frames, watches, clocks, fans, speakers, faucets, electric toothbrushes, clock radios, furniture, decorative items, room monitors, surveillance equipment, roll dispensers, toilets, plumbing, meters, fans, etc., so long as the devices are equipped with an addressable active and/or passive communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In an embodiment, IoT devices may determine proximity and relative location between each other as well and may share location and orientation data both for themselves and for nearby devices. In an embodiment, some IoT devices may create relative maps of nearby IoT devices. The relative maps may be created cooperatively with other IoT devices or based on a plurality of measurement samples. In an embodiment, some IoT devices may be capable of providing absolute location as well as relative location, which may be utilized to anchor relative mapping information to physical locations, such as latitude, longitude and altitude coordinates. In an embodiment, some IoT devices may be capable of beam forming and/or have differential receiver capability and may determine angular information based on signals sent to and/or received from other devices. In an embodiment, sent signals may include relative location information, angular information relative to the originating device, signal strength and/or timing information (such as time of sending, round trip time estimates, etc.). In an embodiment, received signals may also include relative location information, angular information relative to the originating device, signal strength and/or timing information (such as receive time of the originating/triggering signal, processing time, time of sending, round trip time estimates, etc.). In an embodiment, IoT devices may also utilize wireless communication devices such as access points and femto cells as common points of reference and/or to provide angular information and distance information to multiple IoT devices. In an embodiment, angular information and distance information between IoT devices and wireless communication devices may be shared between IoT devices and/or with a server on a network, and may be combined to determine relative and absolute mappings of IoT devices in room, building or other area. Wireless communication devices may be stationary or may provide a moving point of reference at points in time. Wireless communication devices may crowdsource relative orientations and distances of IoT devices to combine, either on the wireless communication devices, on a network server, or on one or more IoT devices to determine a relative map of the IoT devices present. IoT devices may also indicate whether they are stationary or mobile as well as whether they are in motion at the instant of communication and/or some indication of relative location history.

As used herein, the term "area" refers to a physically or virtually defined portion of a structure or environment that is distinguished from other portions of the structure or environment. As such, areas may be delineated or defined by one or more walls separating one area from another area. Additionally or alternatively, areas may be delineated or defined by virtual boundaries based on one or more differing characteristics of the areas or based on a differing purpose for each area. As non-limiting examples, areas within a house may include one or more bedrooms, one or more bathrooms, a kitchen, a living room, a dining room, a great room, a library, an exercise room, a sunroom, a garage, one or more hallways, one or more stairways, etc. Non-limiting examples of areas within an office building may include, for example, one or more offices, conference rooms, hallways, bathrooms, lobbies, kitchens, break rooms, storage rooms or closets, etc.

Referring to FIG. 1, a wireless communication system 10 includes wireless communication devices 12, 14, 16, 18, 20, 22, an access point 24, a base station 26, a network 28, and a server 30. The devices 12, 14, 16, 18, and the access point 24 are disposed inside a structure 36 (e.g., a building). While device 22 is illustrated as being outside of structure 36, device 22 may also be positioned within structure 36 in some examples (such as within a garage of structure 36 if device 22 is a car or is within a car). In the example shown in FIG. 1, devices 12, 14, 16, 18, and 20 may include one or more IoT devices such as appliances, smart light bulbs, thermostats, cameras, and/or any other device that may communicate and operate as described herein. In addition, devices 12, 14, 16, 18, and 20 may include other wireless communication devices that are not typically considered to be IoT devices, such as smart phones, tablet computing devices, laptop computers, desktop computers, and the like. As mentioned above, device 22 may be a vehicle such as a car, motorcycle, truck, sport utility vehicle (SUV), scooter, motorized wheelchair, or any other suitable vehicle that includes wireless communication capabilities. However, the above examples are merely illustrative, and wireless communication device 12, 14, 16, 18, 20, and 22 may be any suitable device with wireless communication capabilities.

The system 10 is a communication system in that components of the system 10 can communicate with one another directly or indirectly, e.g., via the network 28, the access point 24, and/or the base station 26 (or other access points and/or other bases stations not shown). The system 10 is a wireless communication system in that at least some of the components of the system 10 can communicate with one another wirelessly. While a single access point 24 and a single base station 26 are illustrated in FIG. 1, it should be recognized that other quantities of access points and/or base stations may be used.

The term "base station" does not limit the base station 26 to any particular form, protocol, etc. For example, the base station 26 (and/or other base stations not shown) may be referred to as a base transceiver station (BTS), an access node (AN), a Node B, an evolved Node B (eNB), a gNodeB (gNB), etc. In addition, the base station 26 may comprise a femtocell, a pico cell, or the like. Further, the device 22 is a car in this example, and while the primary function of a car is not as a communication device, the car may comprise a communication device as a part of the car (e.g., in an on-board unit or on-board equipment of the car). For simplicity of the disclosure, the car is considered as one type of communication device.

The system 10 comprises an Internet of Things (IoT) network in this example, with the devices 12, 14, 16, 18, 20, 22 configured to communicate with each other, particularly through one or more short-range wireless communication techniques. The system 10 being an IoT network is, however, an example and not required. Examples of short-range wireless communication techniques include Bluetooth communications, Bluetooth Low-Energy communications, near-field communication (NFC), mesh networking (e.g., Zigbee), and wireless LAN communications (e.g., Wi-Fi, Wi-Fi direct, etc.). The devices 12, 14, 16, 18, 20, 22 may broadcast information, and/or may transmit information from one of the devices 12, 14, 16, 18, 20, 22 to another or to a different device such as the access point 24 and/or the base station 26. One or more of the devices 12, 14, 16, 18, 20, 22 may include multiple types of radios, e.g., a Bluetooth radio, a Wi-Fi radio, a cellular radio (e.g., LTE, CDMA, 3G, 4G, 5G New Radio (NR), etc.), etc. such that information may be received using one radio and transmitted using a different radio. Further, one or more of the devices 12, 14, 16, 18, 20, 22 may be configured to determine range to another of the devices 12, 14, 16, 18, 20, 22 (e.g., using round-trip time (RTT), or observed time difference of arrival (OTDOA), or received signal strength indications (RSSI), or one or more other techniques, or a combination of one or more of any of these techniques) and/or to determine angle of arrival (AOA) of a signal from another of the devices 12, 14, 16, 18, 20, 22 and/or from one or more other devices such as the access point 24 and/or the base station 26. In some aspects, devices 12, 14, 16, 18, 20, 22 may receive angle of departure information from other devices.

As described more fully below, a device might trigger a message to be broadcast to other nearby devices when the device is plugged into a network or power source for the first time in an area, or a mobile device may be triggered to broadcast upon entering an area. The broadcast message may include a query to determine the locations, area types, and area identifiers for each device in signal communication with the querying device. In one aspect, one or more devices may act as area monitors and may transmit periodic broadcasts, particularly if they are plugged into a power outlet. Device broadcasts and responses may have presumptive area labels such as living room, bathroom, kitchen, garage, office, or both. Thus, if a house has multiple bedrooms or multiple garages or multiple kitchens, the rooms can be distinguished by the combination of the room identifier and the room type.

Figure 2:
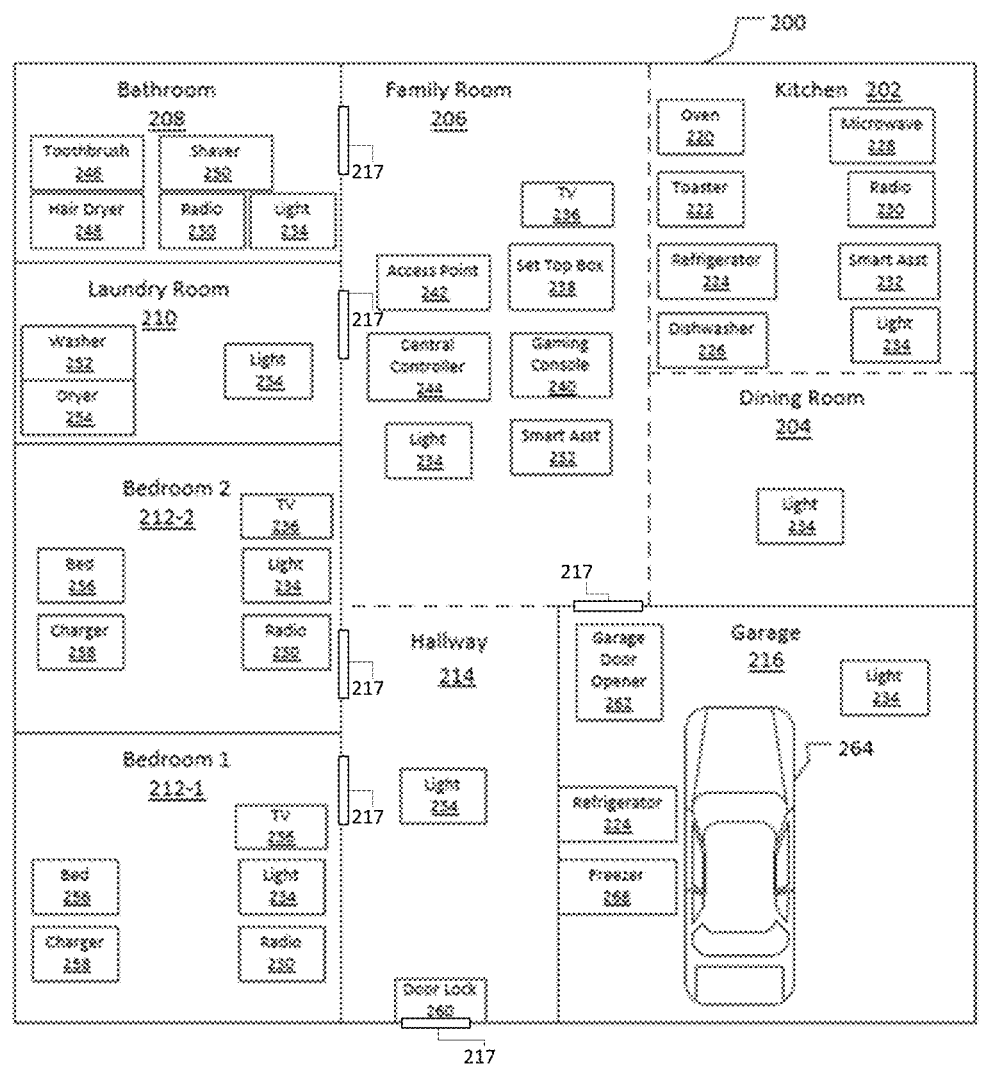
FIG. 2 is a plan view of an example house that may include a plurality of devices.
Figure 2:

Referring to FIG. 2, a portion of the system 10 is shown inside of the structure 36 (i.e., a house 200 in this example). As shown in FIG. 2, the system 10 includes a variety of devices positioned throughout the house 200. The house 200 also includes a plurality of areas corresponding to different living spaces or other rooms within the house. For example, as illustrated in FIG. 2, the house 200 includes areas such as a kitchen 202, a dining room 204, a family room 206, one or more bathrooms 208, a laundry room 210, one or more bedrooms 212 (e.g., a first bedroom 212-1 and a second bedroom 212-2 in this example), one or more hallways 214, and a garage 216. Various doors 217 may provide access to one or more areas of the house. These areas are merely illustrative and any number and type of room or other area may be included in place of, or in addition to, the areas shown in FIG. 2. Each area may include one or more IoT devices or other devices that may determine their own location context, may receive a location context for the device, and/or that may assist other devices in ascertaining the location context of those other devices.

Examples of areas and devices within each area of house 200 are described below. It should be recognized that these examples are merely illustrative and are not limiting. For example, each room may be described as including certain devices that are more commonly found in the room. However, each room may include fewer devices than those identified below, and/or may include different devices than those identified. Each device described herein may include a processor, a memory, and a transceiver for determining, transmitting, and/or receiving data relating to a location context for the device.

An example kitchen 202 may include devices such as an oven 220, a toaster 222, a refrigerator 224, a dish washer 226, a microwave 228, a radio 230 (such as a clock radio or a radio without clock features), a smart hub or assistant 232, and/or a light 234. An example dining room 204 may include a light 234 among other devices. An example family room 206 may include an example television (TV) 236, set top box or video streaming device 238, a gaming console 240, a smart hub or assistant 232, a router or other access point 242, and/or a central controller 244. An example bathroom 208 may include an electric toothbrush 246, a hair dryer 248, an electric shaver 250, a radio 230, and/or a light 234. An example laundry room 210 may include a washing machine (or washer) 252, a drying machine (or dryer) 254, and/or a light 234. An example bedroom 212 may include a smart bed 256, a radio 230, a charger 258 (e.g., for charging cell phones, tablets, etc.), a television 236, and/or a light 234. An example hallway 214 may include a light 234 and/or an electric door lock 260. An example garage 216 may include a garage door opener 262, a light 234, a vehicle 264 (such as a car), a freezer 268, and/or a refrigerator 224. It should also be recognized that each area may temporarily include one or more moveable devices, such as cell phones, wearable electronic devices, tablet computing devices, etc.

In some aspects, each area may be identified by an area type and an area identifier. For example, first bedroom 212-1 may be identified as being an area type "bedroom" and may have an area identifier "area r132". Second bedroom 212-2 may be identified as being area type "bedroom" and may be assigned an area identifier "area r133". Bathroom 208 may be identified as being an area type "bathroom" and may have an identifier "r134". The area types and area identifiers of each area within the house 200 may be assigned by central controller 244 (or a server), smart hub or assistant device 232, access point 242, or by any other suitable devices within the house 200. The area types and area identifiers may be stored in a table or other data structure within the device and/or within any other suitable device of the house 200.

In addition, each device may be assigned one or more initial area type confidence scores that represents a likelihood that the device is located in one or more particular area types. The initial area type confidence score is a score that may be initially assigned to the device based on a type of the device (e.g., toothbrush, oven, television, etc.). The initial area type confidence score may be assigned by central controller 244 (or a server), smart hub or assistant device 232, access point 242, or by the device itself. The initial area type confidence score may be stored in a table or other data structure within the device and/or within any other suitable device of the house 200. In some examples, one or more devices may store a table or other data structure that includes a list of each device associated with a respective initial area type confidence score for each applicable area.

Each device may also be assigned one or more initial area identifier confidence scores that represents a likelihood that the device is located in one or more areas associated with one or more area identifiers. For example, radio 230 in second bedroom 212-2 may have an area identifier confidence score of 75% for area ID r133 and an area identifier confidence score of 10% for area ID r132. The area identifier confidence score may be assigned by central controller 244 (or a server), smart hub or assistant device 232, access point 242, or by the device itself. The area identifier confidence score may be stored in a table or other data structure within the device and/or within any other suitable device of the house 200. In some examples, one or more devices may store a table or other data structure that includes a list of each device associated with a respective initial area confidence score for each applicable area. As indicated above, each device may have a confidence score associated with multiple area types and/or multiple area identifiers. Referring to the example above, the radio 230 in the second bedroom 212-2 may have a high confidence score that it is located in an area type "bedroom" and a relatively low confidence score that it is located in an area type "laundry room". In addition, the radio 230 in the second bedroom 212-2 may have a high confidence score that it is located in the area associated with identifier "area r133" and may have a low confidence score that it is located in the area associated with identifier "area r133".

If a device is queried by another device or broadcasts information to another device, it may transmit the area type and associated area type confidence level for each area it has a record for, and may also transmit the area identifier and associated area identifier confidence level for each area it has a record for. In some embodiments, however, devices may report their area types, area identifiers, and associated confidence levels differently than other devices. In one such example, a device that is battery-powered may not report area types, area identifiers, and/or associated confidence levels unless specifically queried by another device in order to conserve battery power. In another such example, a device that is plugged into an electrical outlet or that is otherwise continuously powered my report or broadcast the area type, area identifier, area type confidence level, area identifier confidence level, and/or any other suitable characteristics periodically in addition to times in which the device is queried. Additionally or alternatively, the device may broadcast or otherwise transmit the area type, area identifier, area confidence level, area identifier, and/or any other suitable characteristics upon a determination that the device is no longer stationary or that the device has moved more than a threshold distance in a period of time.

In some aspects, devices may respond differently if they are part of a cluster or group of associated devices as compared to if the devices are not associated with each other. For example, if an electric toothbrush, a charger for the toothbrush, and a hairdryer are part of a group of devices associated with each other (e.g., associated by common area type, area identifier, etc.), then all devices may not need to respond to a query from a device seeking to determine the area type and/or area identifier of the room. Rather, only one of the devices may need to respond, and the other devices may ignore the query in order to reduce power consumption. However, if one or more devices are specifically identified in the query, then those devices may nonetheless be programmed to respond to the query even if they are battery-powered, for example.

In some aspects, devices may respond differently based on the type of information required. For example, a device such as a mobile phone may be brought into a room, and an application on the mobile phone may attempt to determine the location of the phone within the room. If the mobile phone broadcasts a query to the devices in the room requesting the location of each device, all devices or at least a plurality of devices (such as 3 or more) may respond to the query to enable the mobile phone to trilaterate its position with respect to the responding devices using round trip time (RTT) or received signal strength indicator (RSSI) based techniques.

Each device may also be assigned an anchor device indicator that indicates whether the device is an anchor device for the area. As used herein, the term "anchor device" refers to a device (or group of devices) that has a sufficiently strong association with an area such that the device (or group of devices) is automatically considered to be located in the area. In some examples, a device may be an anchor device for an area if the device has a greater than 90% confidence score for the area. In other examples, a device may be an anchor device if the device has a greater than 95% confidence score for the area, or any other suitable confidence score. In still other examples, a device may be an anchor device for an area if the device has no other location that is reasonably expected to be in other than the area (i.e., the device has a confidence score of 100%). Non-limiting examples of anchor devices associated with areas may include a vehicle for the garage (since a vehicle would not be expected to be in any other area of a house other than the garage) and an oven for the kitchen (since an oven would not be expected to be in any other area of a house other than a kitchen). In some aspects, the anchor device of a particular area may be configured to be a responding device when queries are transmitted within the area. For example, if a mobile phone transmits a query within a kitchen area to determine what area type and/or area identifier is associated with the area, the anchor device or devices within the kitchen (e.g., a stove, refrigerator, etc.) may respond to the query while other devices within the area may not respond.

The devices are configured to communicate with each other if within communication range of each other. Using the communication capabilities of each device, information regarding the devices may be transmitted to each other, transmitted to other devices, and/or transmitted to the central controller 244 and/or the smart hub or assistant 232. Further, communications from the central controller 244 and/or the smart hub or assistant 232 may be received by, or forwarded by, the devices. Further still, the central controller 244 and/or the smart hub or assistant 232 may be a standalone device as shown in FIG. 2 or may be incorporated into any of the other devices within house 200. The system 10, in this example, provides an IoT network that can generate, send, receive, relay or forward, various information (e.g., characteristics of IoT devices, signal measurements, location context, etc.) to facilitate functionality described herein.

In some aspects, a device may determine the area label and/or area identifier based on the combination or association of device types of detected devices within an area, by a detected anchor device or other specific device identifier or device type, by an absence of one or more device types or device identifiers, by an amount of time that the device is within an area, by an amount of time that the device detects other devices or device types within an area, and/or any other suitable characteristic as described herein. For example, a stationary or fixed device such as a toilet may indicate that an area is a bathroom even though a tablet device, mobile phone, laptop, or other transient device is temporarily located within the area. Similarly, the absence of a stove or oven may indicate that the area is not a kitchen even though another device commonly associated with kitchens, such as a refrigerator or a faucet, is present.

Figure 3:
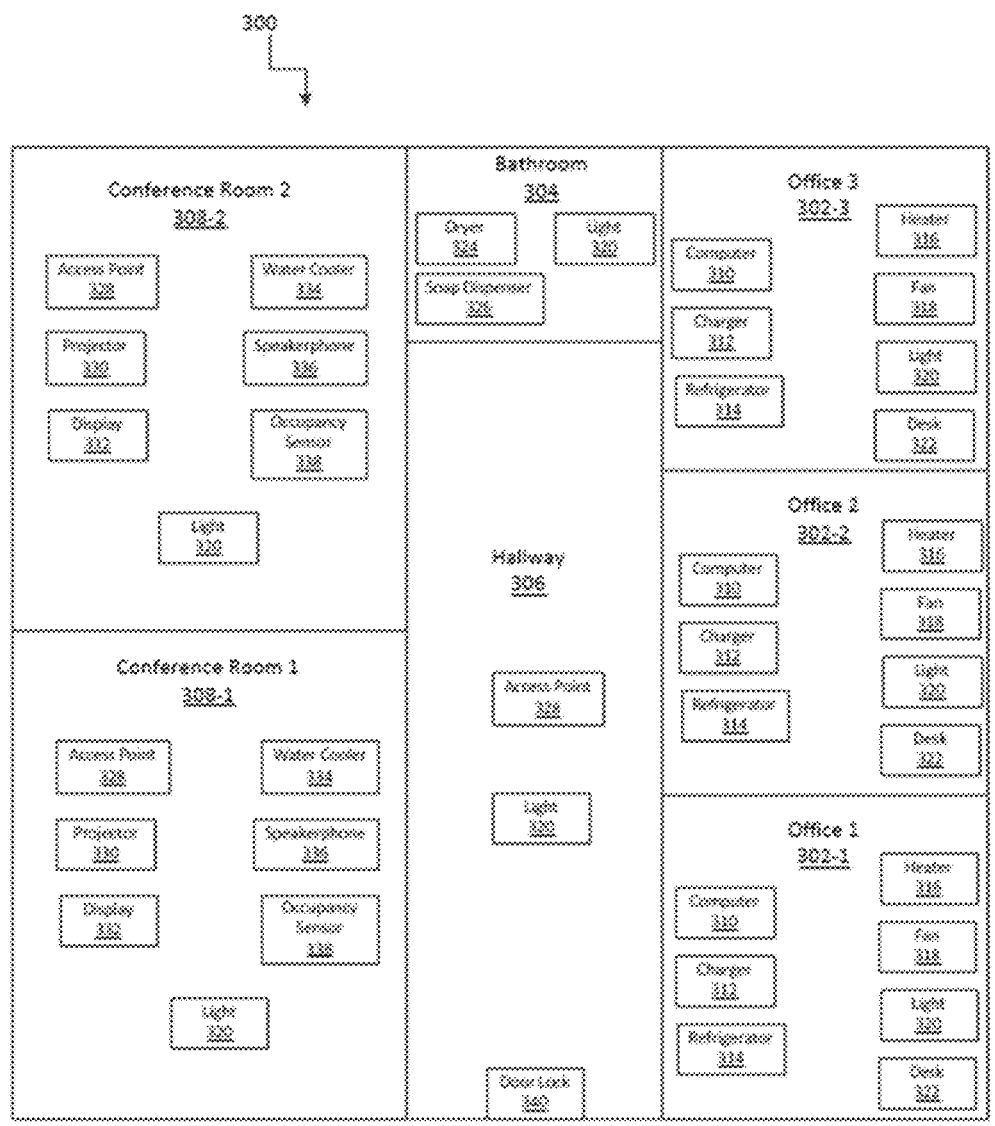
FIG. 3 is a plan view of an example office that may include a plurality of devices.

FIG. 3 is a block diagram of an example structure 36 (i.e., an office building 300 in this example) that includes at least a portion of the system 10.

As shown in FIG. 3, a variety of devices are positioned throughout the office building 300. The office building 300 also includes a plurality of areas corresponding to different working spaces or other areas within the building. For example, as illustrated in FIG. 3, the office building 300 includes areas such as one or more offices 302 (e.g., a first office 302-1, a second office 302-2, and a third office 302-3 in this example), one or more bathrooms 304, one or more hallways 306, one or more conference rooms 308 (e.g., a first conference room 308-1 and a second conference room 308-2 in this example). These areas are merely illustrative and any number and type of room or other area may be included in place of, or in addition to, the areas shown in FIG. 3. Each area may include one or more IoT devices or other devices that may determine their own location context, may receive a location context for the device, and/or that may assist other devices in ascertaining the location context of those other devices.

Examples of areas and devices within each area of office building 300 are described below. It should be recognized that these examples are merely illustrative and are not limiting. For example, each room may be described as including certain devices that are more commonly found in the room. However, each room may include fewer devices than those identified below, and/or may include different devices than those identified. Each device described herein may include a processor, a memory, and a transceiver for determining, transmitting, and/or receiving data relating to a location context for the device.

An example office 302 may include a computer (e.g., a desktop computer or a laptop computer) 310, a charger 312 (e.g., for charging a cell phone or wearable device), a refrigerator 314, a space heater 316, a fan 318, a light 320, and/or an adjustable or smart desk 322. An example bathroom 304 may include a hand dryer 324 (or paper towel dispenser), a soap dispenser 326, and/or a light 320. An example conference room 308 may include an access point 328, a light 320, a projector 330, a display 332 (e.g., a television or monitor), a water cooler 334, a speakerphone 336, and/or an occupancy sensor 338. An example hallway 306 may include a light 320, an access point 328, and/or one or more electronic door locks 340.

Each area may be identified by the presence or absence of certain devices or device types, as discussed above with reference to FIG. 2. For example, an office bathroom may be identified or labeled by the presence of a toilet and towel dispenser even though other office devices, such as laptop computers, charging devices, etc., are detected nearby for a duration of time.

As discussed above with reference to FIG. 2, each device may be assigned an initial area association confidence score that represents a likelihood that the device is located in a particular area. Each device may also be assigned an anchor device indicator that indicates whether the device is an anchor device for the area. The devices are configured to communicate with each other if within communication range of each other in a similar manner as described above with reference to FIG. 2.

As discussed more fully herein, an area label and/or a confidence score that a device is within a particular area may be based on a combination of the other devices that are identified as being within the same area and/or based on what other devices are not within the area. For example, the presence of a screen projector and/or a large screen panel and the absence of computer workstations may result in a high confidence level that a device is in a conference room. An office may be determined by a same computer being present within an area during office hours or always present within the area, and/or based on what other devices are nearby (e.g., personal fans, charging devices, heaters, etc.). An owner of the device and/or assigned owner of an office may be determined based on who the computer or device is assigned to.

As discussed more fully herein, the area label and/or confidence score may also be based on a status of the device or devices and/or an amount of time that the device or devices are detected within the area.

While FIG. 3 illustrates an example office 300, it should be recognized that any other suitable building or structure may operate in a similar manner. For example, a department store or mall may be divided into departments, stores, or other areas. A device may determine its location and/or may determine an area label or area type based on the detected presence or the absence of other devices. For example, a row of televisions may be indicative of an electronics section of a department store or an electronics store within a mall. As another example, a large number and/or variety of kitchen appliances may be indicative of a home goods or kitchen department within a department store, or a home goods or kitchen store within a mall.

Figure 4:
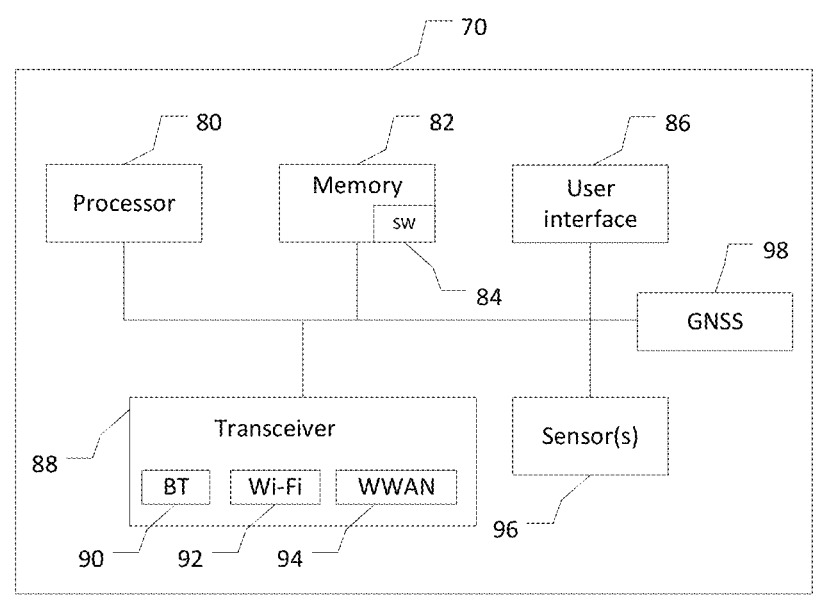
FIG. 4 is a block diagram of an example device.

FIG. 4 is a block diagram of an example wireless communication device 70. In some examples, one or more devices within system 10 may be implemented as a wireless communication device 70, or may incorporate one or more components of wireless communication device 70. For example, wireless communication devices 12, 14, 16, 18, 20, 22, access point 24, base station 26, and server 30 may be implemented as wireless communication devices 70 or may incorporate one or more components of wireless communication devices 70. The components of wireless communication device 70 may, for example, be incorporated into a device having other functionality, such as a toothbrush, clock radio, game console, game controller, charging device, etc. One or more of the components may be used for different purposes. For example, a game controller may include a wireless network interface that may be used for both gaming purposes (e.g., communicating with a game console or other game controllers) as well as for communicating with other devices within system 10 for determining context, location, and the like.

In one aspect, the wireless communication device 70 includes a processor 80, a memory 82 including software (SW) 84, an optional user interface 86, a transceiver 88, and one or more sensors 96. The wireless communication device 70 may also include a GNSS interface 98 in some aspects. The processor 80 may include, for example a central processing unit (CPU), a microcontroller, an application specific integrated circuit (ASIC), etc. The processor 80 may include multiple separate physical cores or processing units that can be distributed in the device 70.

The memory 82 may include random access memory (RAM) and/or read-only memory (ROM) or FLASH or other data storage medium. The memory 82 is a non-transitory, processor-readable storage medium that stores the software 84 and data and/or data structures such as room identifiers, room types, confidence levels and associated devices. Software 84 includes processor-readable, processor-executable instructions that are configured to, when performed, cause the processor 80 to perform various functions described herein. The description may refer only to the processor 80 or the device 70 performing the functions, but this includes other implementations such as where the processor 80 executes software and/or firmware.

The processor 80 is communicatively coupled to the memory 82. The software 84 can be loaded onto the memory 82 by being downloaded via a network connection, uploaded from a disk, etc.

The user interface 86 is optional and may include a display, a microphone, and/or a speaker in some examples. In other examples, the user interface 86 may include one or more buttons, switches, and/or touch sensitive areas of the device that are operable by a user.

The transceiver 88 is configured to send communications wirelessly from the device 70 and to receive wireless communications into the device 70, e.g., from the wireless communication devices 40-48, the access point 24, or the central controller 244. Thus, the transceiver 88 includes one or more wireless communication radios (each with a corresponding antenna or plurality of antennas). In the example shown in FIG. 4, the transceiver 88 optionally includes a Bluetooth radio 90, a Wi-Fi radio 92, and a Wireless Wide-Area Network (WWAN) (e.g., a long-term evolution (LTE)) radio 94. As shown, each of the radios 90, 92, 94 are optional, although the transceiver 88 will include at least one wireless communication radio. Further, one or more other types of radios may be included in the device 70 in addition to, or instead of, the radio(s) 90, 92, 94. If the transceiver 88 includes more than one wireless communication radio, then the transceiver 88 may receive a wireless communication using one of the wireless communication radios, and transmit (e.g., relay or forward), the communication (or a portion thereof) using a different wireless communication radio. The communication may be transmitted to another of the wireless communication devices 40-48 or to another device such as the access point 24. Thus, for example, the device 70 may receive a wireless communication using the Bluetooth radio 90, and forward the communication using the Wi-Fi radio 92 to another device that does not include a Bluetooth radio.

While the transceiver 88 is described herein as a wireless transceiver, in some aspects, the transceiver 88 may be a "wired" transceiver that enables the device 70 to communicate with other devices through a wire, a cable, or another suitable connector. For example, the transceiver 88 may include a local area network (LAN) interface card that enables the device 70 to communicate through an ethernet cable.

The sensor(s) 96 may be configured to measure one or more other types of information. For example, the sensor(s) 96 may include a camera configured to capture images, a microphone configured to measure sound, an orientation sensor (such as a gyroscope) configured to measure/determine an orientation of the device 70, an accelerometer to measure movement of the device 70 (e.g., whether the device is stationary, has moved or is in motion), and/or a thermometer configured to measure temperature, etc. The processor 80 may cause the memory 82 to store indicia of sensed information, e.g., of received sound, captured images, etc.

The GNSS interface 98 may be used to determine a position of the wireless communication device 70. For example, the GNSS interface 98 may include one or more antennae that receive signals from a satellite positioning system (SPS) such as GPS, Beidou, GLONASS, Galileo, or the like. The processor 80 may determine a position of the wireless communication device 70 using the signals received from the SPS and/or based on data or signals from other components such as the WWAN radio 94, the Wi-Fi 92 radio, sensors 96, or other suitable data. The position may include a latitude and longitude of the wireless communication device 70 in some aspects. The processor 80 may correlate or anchor the determined position of the wireless communication device 70 with map data or data indicating the relative position of other devices in communication range of the device 70.

Characteristic Determination

The processor 80 is configured to generate, store (via the memory 82), modify, and transmit (via the transceiver 88) device characteristics corresponding to the device 70. The processor 80 may determine and update the characteristics, e.g., each time the processor 80 detects a possible change in a characteristic (e.g., range and/or AOA to another device, position of itself, a new device within communication range, etc.). The device characteristics and their respective values stored by any particular device will typically vary depending on that device. Example characteristics and values are illustrated and described with reference to FIG. 5.

Figure 5:
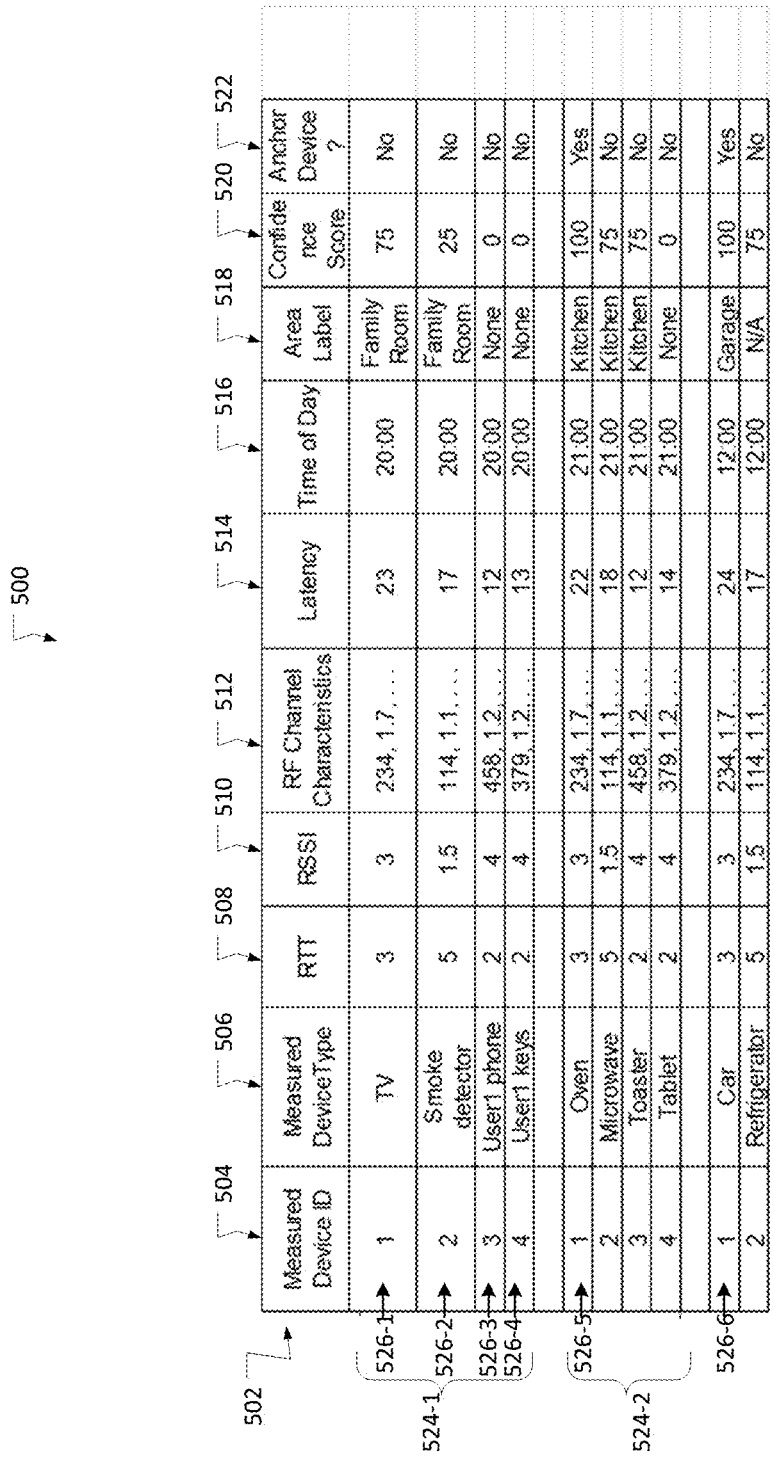
FIG. 5 is an example table that shows a plurality of device characteristics.

FIG. 5 illustrates a characteristic table 500 that includes indications of characteristics 502 and values of the characteristics 502. In one example, the processor 80 may generate and maintain characteristic table 500. In the example shown in FIG. 5, the characteristics 502 include a measured device ID 504, a measured device type 506, a round trip time (RTT) 508, a received signal strength indicator (RSSI) 510, radio frequency (RF) channel characteristics 512, a latency 514, a time of day 516 that measurements were taken or received, an area label 518, a confidence score 520 for the area label 518, and an anchor device indicator 522. It should be recognized that not all characteristics 502 may be determined and/or stored for each device, and that other suitable characteristics may be determined and/or stored as desired. For example, while not shown in FIG. 5, other characteristics may include, for example, a manufacturer of the device, whether and how long the device has been stationary, whether the device is near a companion device (e.g., whether an electric toothbrush is near a charger, or if it is just placed on a nightstand), an owner or custodian of the device, or other suitable characteristics. In some aspects, a first device may be stationary while a second associated or companion device may be mobile. For example, a toothbrush charger may be stationary while the electric toothbrush associated with the charger is mobile. In such aspects, the mobile device may update its location, area label, and/or area ID when the mobile device is moved back to the stationary device or within a threshold distance of the stationary device. For example, when the electric toothbrush is returned to its charger, the toothbrush may query the charger and then set its area label and/or area ID to the area label and/or area ID reported by the charger. Alternatively, the toothbrush may store the area label and area ID of its "normal" location (i.e., on the charger), and may reset its area label and/or ID to the stored label and/or ID when the toothbrush detects that it has returned to the charger.

The processor 80 may store characteristics of other devices (i.e., that are measured or determined by other devices and that are then transmitted to device 70) in addition to characteristics measured or determined by device 70. As described more fully herein, the processor 80 may maintain tables of characteristics for devices presently and/or formerly within communication range of the device 70. Thus, the processor 80 may store characteristics of other devices and/or may relay the characteristics to other devices. In some examples, the processor 80 may combine the characteristics into one or more profiles based on a time of day that the characteristics were measured or determined, based on a location that the characteristics were measured or determined, or based on any other suitable criterion.

In some aspects, certain devices such as anchor devices, hubs, or servers may store the characteristics and profiles of all devices within a structure, area, or group of areas. For example, in some embodiments, a central router or smart home hub may store the characteristics and profiles of all devices within a home to prepare and maintain a full mapping of the devices and associated area labels and area IDs within the home. Other devices may store the characteristics and/or profiles of only a subset of devices within an area or structure, such as the characteristics and/or profiles of anchor devices, as well as their own characteristics and/or profiles.

In some aspects, mobile devices that are not fixed in a particular location may "check in" or "check out" with anchor devices when the mobile devices move out from or into an area. For example, a mobile device may "check out" with an anchor device for a particular area by notifying the anchor device that the mobile device is no longer stationary such that the mobile device's location may not have a sufficiently high confidence level to be associated with the area any longer. Likewise, if the mobile device returns to an area, the mobile device may "check in" with the anchor device, indicating that the mobile device is now back in the area. In a similar manner, a device may "check out" with an anchor device when the device is about to transition to a sleep or low-power state, and may "check in" with the anchor device when the device returns to a higher power state or otherwise wakes up.

The characteristics may include, for example, values of RF (radio frequency) signals, indicia of devices transmitting the RF signals, or values measured by the sensor(s) 96. The processor 80 may obtain the profiles and the characteristics by measuring, determining, and/or receiving the values of the characteristics. Characteristics can be shared, stored, and used for various purposes such as determining area labels, determining changes in environments, and/or triggering actions, for example.

To determine or measure the characteristics, the processor 80 may be configured to initiate a characteristic determination mode intermittently (e.g., periodically at regular intervals, at irregular intervals, at variable intervals, in response to a trigger, etc.). In some aspects, the processor 80 may also broadcast or otherwise transmit the characteristics of its own device either periodically or at any other suitable interval. Additionally or alternatively, the processor 80 may broadcast or otherwise transmit the characteristics upon a determination that the device is no longer stationary or that the device has moved more than a threshold distance in a period of time. The characteristic determination mode may include a sniffer mode in which the processor 80 passively scans and measures signals from neighboring devices. The characteristic determination mode may also or alternatively include an active discovery mode in which the processor 80 sends inquiries or queries to one or more neighboring devices, e.g., by sending a ping (that may be unicast, multicast, or broadcast) and/or to a server (e.g., central controller 244), hub device, or anchor device. The processor 80 may analyze measurements of signals received by the device 70 (e.g., passively or in response to an inquiry by the processor 80) to determine profile and/or characteristics such as RTT, RSSI, device ID, channel estimate (estimate of channel impulse response), etc. The characteristic determination mode may be triggered by an external entity such as a neighboring device or the central controller 244 sending a signal to the device 70, e.g., that indicates to initiate the characteristic determination mode. The amount of time spent sniffing (listening) for signals and/or the time(s) between sniffing may vary, and may depend upon a device state. For example, the processor 80 may sniff more often if a device is in a relatively-higher activity state (e.g., a high activity or high power state) than if the device is in a relatively-lower activity state (e.g., an inactivity state or a sleep state). As another example, the frequency of sniffing may decrease in response to the measured profile being relatively static, i.e., not changing or changing little of a threshold amount of time. In this case, the processor 80 may enter a sleep mode, where no sniffing is performed, until an event occurs (e.g., passage of an amount of time or detection of device movement).

In some aspects, a characteristic table may include one or more links to records of other devices that are determined to be in the same area (i.e., that are determined to have the same area label and/or area ID). Such linked records may be used in place of, or in addition to, the area labels and/or area IDs in the characteristic table.

The processor 80 may be configured to produce and/or maintain (e.g., modify/update) one or more characteristic tables with determined or measured characteristic information for each profile. For example, referring to FIG. 5, the processor 80 may be configured to produce and maintain characteristic table 500 with profiles 524. Each of the profiles 524 represents measurements or determinations of characteristics of devices detected within communication range during a measurement time (e.g., during a characteristic determination mode). Each profile 524 includes subsets 526 of values of profile characteristics 502. In this example, the subset 526-1 represents determined characteristics for a television, the subset 526-2 represents determined characteristics for a family room smoke detector, the subset 526-3 is for a phone associated with User1, and the subset 526-4 is for keys associated with User1. To fill the characteristic table 500, the processor 80 may be configured to determine or measure values of the profile characteristics 502 in the characteristic determination mode.

The processor 80 may analyze one or more signals received from a device to determine one or more values of the characteristics 502. The measured device ID 504 identifies the device from which one or more signals were received to determine the associated profile information. As shown, the values of the measured device IDs 504 are numbers but other values may be used, for example, a MAC (Media Access Control) address for the respective device (that may or may not be mapped to a label). In one embodiment, the processor 80 may also assign a measuring device ID (not shown) that indicates which device obtained or performed the measurements or determinations for the characteristics 502. The processor 80 may be configured to assign a value of the measuring device ID to each subset 526 of the profiles 524, or may be configured to assign a value of the measuring device ID to the profile 524 as a whole (i.e., one measuring device ID for the entire profile 524).

The RF channel characteristics 512 may include, for example, delay spread, peak power to average power ratio, etc. Here, the delay spread (a measure of multipath richness of a communications channel) is identified as the difference in nanoseconds between a first arrival time of a signal from a device and a last arrival time of that signal. The latency 514 corresponds to the transmitting device, i.e., the device from which the one or more signals were received by the processor 80.

The characteristic table 500 may be produced and/or maintained by the device 70 and/or the central controller 244.

The processor 80 may be configured to determine and fill the characteristic table 500 with a time of day 516 corresponding to a timing of signals used to determine values of the categories 502. For example, the processor 80 may assign a value to the time of day 516 based upon when the characteristic determination mode is initiated that results in determining/measuring values of other ones of the characteristics 502 for the respective profile subsets 526.

The processor 80 may also determine or receive an area label 518 for a measured device (i.e., for a device that has the measured device ID 504 for a profile entry). An area inference (also referred to herein as a location context) associated with the measured device's location may include the area label and/or the area identifier. For example, the area label represents an inference that the measured device is located within an area identified by the area label and/or the area identifier. In one example, the area label is a category of the area. For example, an area label of "Kitchen" indicates that the associated area is in the area type or category of a kitchen. As another example, an area label of "Bedroom" indicated that the associated area is a type of bedroom. This is in contrast to an area identifier which might uniquely identify that particular area. For example, an area that is the master bedroom may have an area label of "Bedroom" but may have an area identifier of "Master Bedroom", "Bedroom #1", or "area 112". While the characteristic table 500 described herein includes an area label 518, it should be recognized that the characteristic table 500 may additionally or alternatively include an area identifier as described above to provide more granular location context for the device(s) associated therewith.

In one aspect, the processor 80 receives the area label 518 and/or area ID from the measured device in response to a query or ping, for example, or as part of a communication during the characteristic determination mode. Additionally or alternatively, the processor 80 may determine or associate the area label 518 or area ID based on the determined distance between the device and the measured device, based on a signal strength (e.g., RSSI) of communication received from the measured device, and/or based on any other suitable characteristic of the measured device. The processor 80 may additionally or alternatively receive the area label 518 from a server, anchor device, or hub device as described herein. The processor 80 may also receive a confidence score 520 for the measured device's area label 518 as well as an anchor device indicator 522. For example, the measured device may determine an area label representing the name or descriptor for the area that the measured device determines it is located within. The measured device may assign a confidence score to the area label to indicate a level of confidence that the area label is accurate as applied to the location of the measured device. In the example shown in FIG. 5, the confidence scores are percentage scores, such that a value of 75 represents a confidence of 75%.

In another aspect, the processor 80 determines the area label 518 and/or area ID based on the measured characteristics and/or signals received from nearby devices. For example, as described more fully herein, the processor 80 may determine the area label 518 and/or area ID for its own device based on the measured device types 506 of each device having an RSSI 510 above a predetermined threshold. The processor 80 may also determine the area label 518 and/or area ID using any other characteristic of the devices it detects and/or communicates with (or the fact that the device did not detect certain devices), or based on data transmitted to the device from a server, hub device, or anchor device.

The anchor device indicator 522 is a Boolean value (i.e., yes/no, true/false, etc.) in the example shown in FIG. 5. The anchor device indicator 522 represents a determination by the measuring device whether the device has a sufficiently strong association with an area associated with the area label such that the device is automatically considered to be located in the area. As discussed above, in some examples, a device may be an anchor device for an area identified by an area label if the device has a greater than 90% confidence score for the area or area label. In other examples, a device may be an anchor device if the device has a greater than 95% confidence score for the area or area label, or any other suitable confidence score. In still other examples, a device may be an anchor device for an area if the device has no other location that it is reasonably expected to be in other than the area (i.e., the device has a confidence score of 100%). For example, in the example shown in FIG. 5, the oven identified in subset 526-5 is an anchor device for area label "Kitchen". Accordingly, the oven is considered to be located in the kitchen with a 100% confidence score in one embodiment. In addition, the car identified in subset 526-6 is an anchor device for area label "Garage". Accordingly, the car is considered to be located in the garage with a 100% confidence score in one embodiment.

In one embodiment, the device 70 determines whether a measured device is an anchor device, rather than the measured device transmitting the anchor device indicator. Accordingly, in one embodiment, the device 70 receives a confidence score and an area label from the measured device and separately determines whether the measured device is an anchor device for the area label. The determination may be done based on how closely the measured device type correlates with the area label. For example, the device 70 may determine that ovens have a sufficiently strong association with kitchens that the oven would not reasonably be expected to be located in any other area than the kitchen.

In another aspect, an anchor device may be a device that is installed in a fixed location and that is associated with that fixed location. For example, an alarm system may include a hub, a plurality of contact or motion sensors, and one or more cameras. A contact sensor on a front door or window may be sufficiently fixed to the door or window such that the contact sensor may be considered an anchor device for the door or window. The alarm system hub may include a record that associates each contact sensor with an identified location (e.g., front door camera for the front door, family room motion detector for the family room, etc.). Accordingly, other devices may query the sensors and/or the hub to determine that the sensors are anchor devices and to determine the area label and/or area ID of each sensor. Other suitable devices installed in known locations may also be anchor devices, such as access points, thermostats, lights or lighting fixtures, etc. For example, in some aspects, one or more lights may be associated with one or more areas. Each light may automatically associate with other nearby devices using the techniques described herein and/or a user may manually associate the lights to each area.

While the characteristic table 500 includes an anchor device indicator, in some embodiments, the anchor device indicator may be omitted. For example, the device 70 may determine whether a measured device is an anchor device for an area based on the confidence score of the area label transmitted by the measured device. For example, in one embodiment, the device 70 may determine that a measured device is an anchor device for an area label if the measured device has a confidence score greater than or equal to 90%, 95%, or any other suitable threshold.

The device 70 may use the profiles 524 and characteristics of table 500 to determine the device's 70 own area label, confidence score, and anchor indicator. This process is described more fully with reference to FIG. 6. The device 70 may then transmit its determined area label, confidence score, and/or anchor indicator to other devices within communication range.

For example, the processor 80 may send out and/or receive profile information to/from another device to help with the determination of profiles. The processor 80 may send and receive such information directly to and from the other device. Profile information received from another device may be combined by the processor 80 with profile information determined by the processor 80 help improve the quality (e.g., accuracy) of the profiles 610 determined by the processor 80. The processor 80 may use received profile information to re-determine profile information and characteristics 502 of the profiles 524. For example, profile information determined by a mobile device, such as a smart phone, may be combined with profile information determined by one or more static devices. The processor 80 may use the received information to help train the determination of profile information by the processor 80 (e.g., based on information from the sensor(s) 96), particularly if the received information comes from a device with more accurate sensing than the device 70.

In some embodiments, anchor devices are determined by the devices themselves or by devices that receive their data. In other embodiments, a user may input data into a user interface of a device to indicate that the device (or a separate device in communication with the device) is an anchor device. For example, when an appliance is installed, or during a registration process for an appliance, a user may receive a prompt asking the user to confirm that the appliance is located in a particular area (such as a kitchen). If the user confirms that the appliance is located in the area, the appliance becomes an anchor device for that area. Similarly, if the user specifies that the appliance is actually located in a different area, the appliance becomes an anchor device for the different area.

Since anchor devices are considered to be bound to an area, anchor devices are presumed to be immobile or stationary. Accordingly, an appliance or other device that is determined to be an anchor device may have the anchor device indicator reset to a false or "no" value, for example, if the appliance or device is moved. More specifically, if a device detects that it has moved (based on a signal from an accelerometer, gyroscope, or the like), the device may set the anchor device indicator to a false value. Likewise, if a device receives data from a measured device that indicates the measured device is an anchor device, the device may change the anchor device indicator to a false value if it detects that the measured device has moved (e.g., based on the device's own determination that it is stationary while the measured device has changed positions, etc.).

Figure 6:
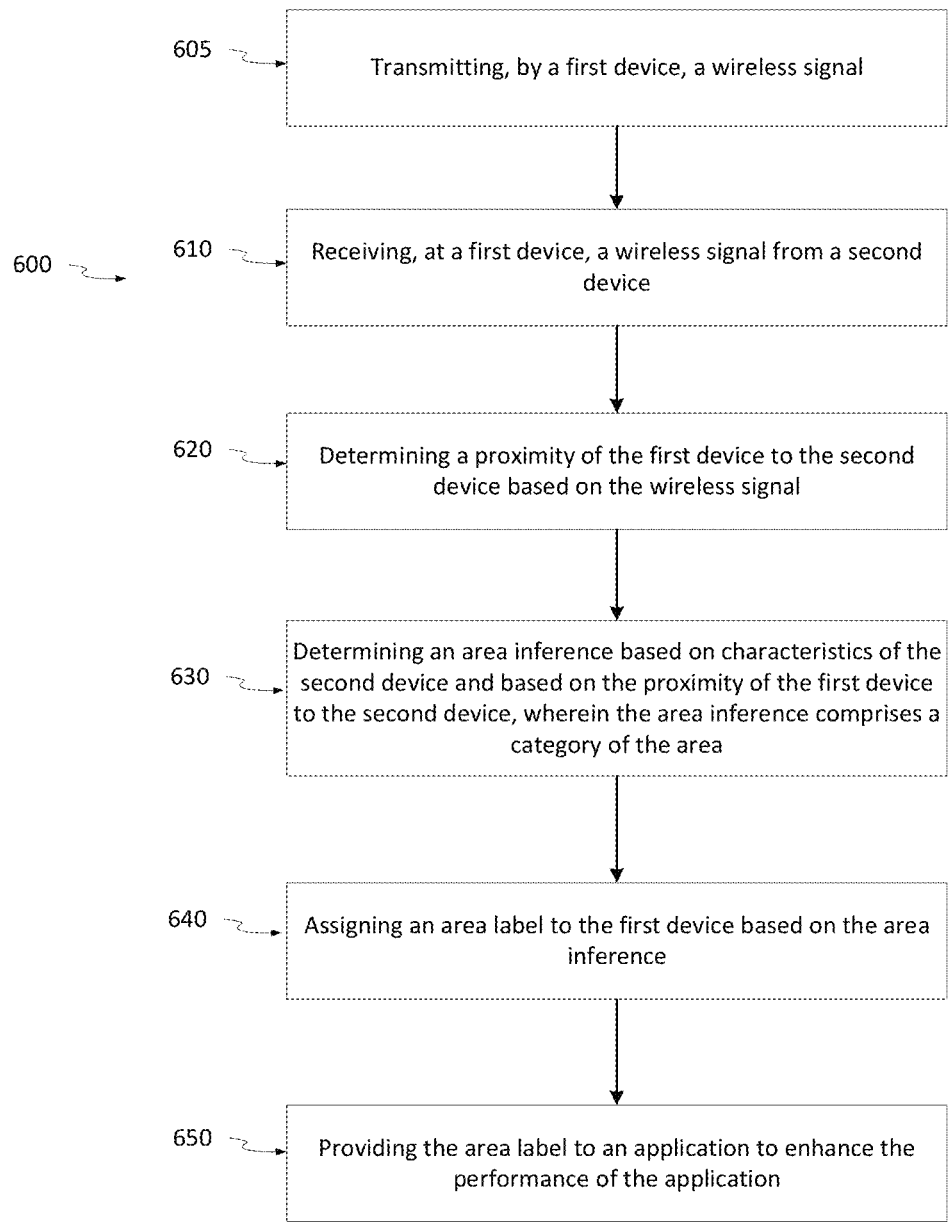
FIG. 6 is a flowchart illustrating an example method of determining a location context of a first device.

FIG. 6 is a flowchart illustrating an example method 600 of determining a location context of a first device. The first device may be an appliance or other IoT device, or may be a mobile phone, for example. In some embodiments, the first device is a device 70 described above with reference to FIG. 4, which may be embodied as one of the appliances, IoT devices, or other devices described above with reference to FIGS. 1-3. In the following description, the first device will be described as a mobile device such as a smart phone, although the method 600 is not limited to this example.

Accordingly, in the example described in FIG. 6, the steps of the method 600 may be performed by the first device, such as by a processor of the first device. Alternatively, another device may perform the steps of the method 600. For example, a central controller, a smart hub or smart assistant, a computer, a server, or any other suitable device may perform the steps of the method 600 to determine the location context of the first device.

At block 605, the first device transmits a wireless signal to advertise its presence and/or location to other devices in an area. For example, the first device may transmit a broadcast message to any devices within the area requesting location and/or other characteristics of the devices within the area. The broadcast message may include the first device's determined position, device type, device identifier, transmit power, transmit time, and/or any other suitable characteristic. Block 605 is optional in some embodiments, however, since other devices may not need to be specifically queried before transmitting or broadcasting their own positions and/or characteristics. In some aspects, devices may use the broadcast or other transmissions to determine ranging based on RTT, RSSI, time of arrival (TOA), or other suitable methods.

At block 610, a wireless signal from a second device is received at the first device. The wireless signal from the second device may be transmitted from the second device in response to the first device's broadcast message in block 605, or may be independently generated. In some embodiments, the second device is a device 70 described above with reference to FIG. 4, which may be embodied as one of the appliances, IoT devices, or other devices described above with reference to FIGS. 1-3. In the following description, the second device will be described as an appliance, although the method 600 is not limited to this example. The first device may sometimes be referred to in FIG. 6 as a measuring device while the second device may sometimes be referred to as a measured device.

More specifically, in one embodiment, the first device may enter a characteristic determination mode in which the first device listens for or requests data indicative of the characteristics of the second device. The second device may transmit wireless signals representative of the characteristics of the second device to the first device at periodic intervals (e.g., due to a periodic broadcast or reporting schedule), intermittently (such as when the second device exits a sleep mode or low power mode), and/or in response to receiving the request from the first device. The first device may also measure characteristics of the second device, such as an RTT, RSSI, RF channel characteristics, etc. as described above with reference to FIG. 5.

At block 620, the first device determines a proximity of the first device to the second device based on the wireless signal. For example, the processor of the first device may determine the proximity of the first device to the second device based on the measured or determined characteristics of the second device as described above with reference to FIG. 5. In one aspect, the determined proximity may be a calculated distance between the first device and the second device. In other aspects, the proximity may be a determination whether the signal strength (e.g., RSSI) or other characteristic of the second device equals or exceeds a threshold.

In one example, the first device may measure an RTT based on an amount of time that the message transmitted from the first device to the second device receives a corresponding message transmitted from the second device to the first device. Since the time that a signal takes to propagate from one device to another is equal to the speed of light times the distance, the first device can determine the proximity (or distance) of the first device to the second device based on the RTT. More specifically, the first device may calculate the RTT to be the difference in time from when the message was transmitted to the second device and the time in which the message was received at the first device, multiplied by the speed of light, divided by 2. The first device may also subtract the time it takes the second device to process the first device's message when calculating the RTT. The second device may transmit the processing time in its response message, or the first device may estimate the processing time based on the type or identifier of the second device. It should be recognized that other known methods for determining proximity to a device may be used to determine the proximity or distance from the first device to the second device.

In one example, the first device may measure the RSSI of transmissions from the second device to determine a proximity of the first device to the second device. Since signal strength is generally inversely proportional to the square of the distance traveled by the signal, the first device may determine the proximity of the first device to the second device based on the RSSI of signals transmitted by the second device. For example, the second device may report its transmitted signal strength to the first device when the second device transmits the wireless signal to the first device. Since the signal strength reduces by the square of the distance traveled, the first device may compare the received signal strength to the transmitted signal strength and determine the distance accordingly. The first device may filter out signals in which the RSSI is lower than a threshold in some embodiments to minimize an amount of error introduced by signals traveling through walls, for example. Since walls and windows may significantly attenuate signals traveling through the walls or windows, the signal strength (RSSI) may be a better indicator of whether the first device and the second device are in the same room or area. For example, devices that are relatively near each other and that have no obstructions would exhibit a relatively low RTT but a relatively high RSSI. However, devices that are relatively near each other but are on opposite sides of a wall may exhibit a relatively low RTT and a relatively low RSSI due to the signal attenuation characteristics of the wall. Thus, the first device may use the RSSI of the second device's signal, alone or in combination with the RTT or other proximity determination method, to determine whether the second device is proximate the first device such that the devices are considered to be in the same area.

In some aspects, the first device may determine a relative location with respect to the second device in addition to, or instead of, determining the proximity in order to determine whether the devices are in the same area. For example, if the first and second devices include 5G New Radio (NR) modems or other modems capable of beamforming, the devices may determine a relative location with respect to each other by determining an angle of arrival of beamformed signals. Additionally or alternatively, other sidelink or peer-to-peer positioning techniques may be used to enable the first device to determine a relative position with respect to nearby devices such as the second device.

At block 630, the first device determines an area inference based on characteristics of the second device and based on the determined proximity of the first device to the second device. It should be recognized that the first device may also determine the area inference based on the characteristics of other devices detected by the first device in addition to the second device. The first device may determine the area inference based on the characteristics of each other device individually or based on one or more combinations of devices. The area inference may include a category of the area, and may be assigned an area label representing the category as noted above. In one example, the area inference may be an inference that the device is located within a kitchen of a home, where the kitchen is a category of areas or rooms. Other categories of areas within a house include bedrooms, bathrooms, offices, laundry rooms, dining rooms, garages, hallways, studies, dens, etc. Categories of areas within a workplace or office building may include offices, cubicles, bathrooms, conference rooms, lobbies, elevators, stairways, and the like.

In one example, the first device may determine that the second device is sufficiently proximate (e.g., within a threshold distance) to the first device such that both devices are in the same room or area. The first device may also identify the area label associated with the second device (or other characteristics of the second device described above in FIG. 5) to determine the area inference of the first device. In other words, the first device may infer that it is located in the same area (identified by the second device's area label) based on the determined proximity and optionally other characteristics of the second device.

In some instances, disambiguation may be needed to determine whether the first device is in the same area as the second device. For example, in a house, a dining room may be adjacent to a kitchen and/or a family room. In some cases, there may not be a physical separation between the dining room and the kitchen, for example. As such, when the first device is in the dining room, the first device may receive wireless signals from devices in both the kitchen and the dining room, where the signals have RSSI or RTT measurements that might exceed the relevant thresholds. Accordingly, the first device may use other data to confirm or determine whether the first device is in the same area as the second device.

In one such example, the first device may receive and/or determine characteristics of a plurality of devices within communication range of the first device. For example, the first device may receive wireless signals from one or more devices other than the second device and may determine a proximity to the other devices based on the wireless signals. In one example, the first device may calculate an RTT to each other device that transmits a wireless signal to the first device to determine the proximity to that device. The first device may also receive or determine other characteristics of the other devices (as set forth in FIG. 5), such as an area label, confidence score, and/or anchor device indicator for each device.

While a single confidence score has been described as being determined for each device, it should be recognized that a plurality of confidence scores may be determined for each device. For example, a device may determine that it is possibly located in one of several rooms, such as a kitchen, a dining room, or a family room. Accordingly, the device may have different confidence scores for each room, such as 50% for the kitchen, 40% for the dining room, and 35% for the family room.

Once the first device determines a proximity to each device (including the second device), the confidence score, and/or the anchor device indicator, the first device may execute a voting function or other algorithm to resolve the ambiguity and determine the most likely area label for the first device.

In one example, the first device executes an averaging algorithm that determines the confidence score for the first device being located in the area by averaging the confidence scores for each other device for that area. For example, if the second device has a confidence score of 50% that it is located in the kitchen, and a third device has a confidence score of 40% that it is located in the kitchen, the first device may determine a confidence score of 45% that the first device is located in the kitchen. Alternatively, the first device may determine that it is located in the same area as the device or devices with the strongest signals (e.g., highest RSSI), or of the devices that have a signal strength above a threshold.

In another example, the first device executes a weighted averaging algorithm that determines the confidence score based on the weighted average of the confidence scores of proximate devices or of the devices in communication range. For example, the first device may apply a higher weight to the confidence scores of devices located closer to the first device, and may apply a lower weight to the confidence scores of devices located further away from the first device.

In another example, the first device may apply an averaging algorithm or a weighted averaging algorithm to the confidence scores of the N closest devices. In other words, the first device may choose the N closest devices, and then may use an averaging algorithm or a weighted averaging algorithm to determine the confidence score of the first device for the area.

The first device may determine the confidence score for each area identified by each other device in proximity to the first device and/or in communication with the first device. The first device may then determine the area inference based on the highest confidence score. For example, if the first device determines a confidence score of 50% for the living room and 60% for the dining room, the first device may determine that it is most likely located in the dining room (i.e., the area inference is the dining room).

As previously noted, an anchor device indicator for a device being associated with an area may be correlated with a high confidence score for the area (e.g., 90%, 95%, 100%, etc.). Thus, the determination of the area inference may include determining that the second device or another device is an anchor device associated with the area. In some examples, the second device or another device may determine that it is an anchor device for an area based on the confidence score for that area. More specifically, the first device may determine a confidence score of whether the first device is associated with the area. If the confidence score exceeds a threshold (such as 90%, 95%, or another suitable threshold), the first device may determine that it is an anchor device for the area.

In some aspects, determining a confidence score includes correlating device types of devices in proximity to the first device. For example, the first device may determine that the second device and a third device are in proximity to the first device (e.g., that the second device and the third device are within a threshold distance, such as 3 feet, 5 feet, etc. from the first device). The first device may also determine that the device type of the second device has a high correlation with the device type of the third device such that there is a high likelihood that the second device and the third device are in the same room or area. For example, the second device may be a toaster and the third device may be a refrigerator. Accordingly, the first device may determine that the second device and the third device are likely to be located in the kitchen. Thus, if the first device is proximate to the second device and the third device, the first device may determine that it is likely located in the kitchen as well. This may be useful in situations in which one or more devices do not already have an area label associated with the devices, in situations where one or more devices do not have a sufficiently high confidence score, and/or in situations where one or more devices have recently moved, for example.

Additionally or alternatively, determining a confidence score additionally or alternatively includes comparing the device types of detected devices against a list or array of device types associated with each area label. For example, each area label may include a list of device types commonly located in that area along with a confidence score for each device type being associated with the area. Thus, there may be a list of device types typically found in the kitchen and a probability or confidence score associated with each device type being in the kitchen. Alternatively, there may be a list of device types, with each device type being associated with a list of areas that the device is typically found and an associated confidence score for that device type and area. The list may be stored in each device, in a hub, in a server, and/or an anchor device, for example.

At block 640, the first device assigns an area label to the first device based on the area inference. In one aspect, the first device may assign an area label to itself that matches the area label of the other devices that the first device determines are in the same area as the first device. In some aspects, the first device may also assign area labels to other devices in communication with the first device. In one example, if one or more devices do not have an area label assigned (e.g., they are first placed into use, etc.), the devices within the same area may coordinate with each other to agree on a common area label and/or area identifier to ensure they all use the same labels and identifiers.

At block 650, the first device may provide the area label to an application to enhance the performance of the application. The first device may also transmit the area label to one or more other devices, such as the second device. In some aspects, the first device may transmit the area label to another device, such as the second device or a third device, to enhance the performance of an application executable on the second device or the third device.

For example, in an aspect in which the application is executable on the first device, the first device may store the area label in memory and may provide the area label to the processor when the processor accesses the memory. In one example, the application is a search engine used by a smart assistant or mobile phone. For example, the search engine may receive a query from a user. The query may be ambiguous in one or more aspects such that a disambiguation process must be executed to refine the query. For example, the user may input a query for a smart assistant to purchase "paper". Since "paper" may mean toilet paper, printer paper, or a newspaper, among other items, the smart assistant needs to disambiguate the term "paper". The smart assistant may use the area label to refine the term and determine the most appropriate item to order. For example, if the area label indicates that the first device is located in a study or office, the search engine and/or smart assistant may determine that the user is requesting printer paper, and may order the printer paper accordingly. If the area label indicates that the first device is located in a bathroom, however, the search engine and/or smart assistant may determine that the user is requesting toilet paper, and may order the toilet paper accordingly.

Alternatively, the search engine and/or smart assistant may disambiguate the query by determining a distance to each of the possible devices associated with the query to determine which device is closest. Once the closest device is identified, the search engine or smart assistant may resolve the ambiguity in view of the identified device. Continuing the example above with a request for paper, a printer may be determined to be the closest device to the querying device. Thus, the search engine or smart assistant may determine that the user is requesting printer paper, and may direct printer paper search results to the user or may automatically order printer paper for the user. Accordingly, as used herein, enhancing the performance of an application may include decreasing an ambiguity of a query or search, improving an efficiency of the application or search, improving a speed in which search results are provided or in which a search is concluded, and/or any other suitable improvement of an application.

In another example, the first device may receive the query from the user. The first device may transmit the query to a server (e.g., a network information server or a web server) along with the determined area type, location of the device (e.g., latitude and longitude), and/or area identifier associated with the first device. The server may user the area type to disambiguate the query to determine what product or service the user is requesting. The server may determine the area label associated with the device and may provide the appropriate product or other response to the first device to present to the user. In one aspect, the first device may ask the user to clarify the query if the server or first device is unable to disambiguate the query.

While the foregoing method 600 has been described with reference to a first device determining an area inference and area label for itself, it should be recognized that method 600 may be used by another device, such as a central controller, smart hub or assistant, mobile device, or another suitable device, to determine area inferences and area labels for all or a subset of devices in communication with the device.

Discussions of coupling between components in this specification do not require the components to be directly coupled. These components may be coupled directly or through one or more intermediaries. Additionally, coupling does not require they be directly attached, but it may also include electrically coupled, communicatively coupled or any combination thereof.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating,"

"determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of determining a location context of a first device, the method comprising:

receiving, at the first device, a wireless signal from a second device;

determining a proximity of the first device to the second device based on the wireless signal;

determining an area inference based on characteristics of the second device and based on the determined proximity of the first device to the second device, wherein the area inference comprises a category of the area, and wherein determining the area inference comprises determining that the second device is an anchor device associated with the area;

assigning an area label to the first device based on the area inference; and providing the area label to an application to enhance the performance of the application.

2. The method of claim 1, further comprising transmitting the area label to the second device.

3. The method of claim 1, wherein providing the area label to an application comprises transmitting the area label to a third device, wherein the application is executable on the third device.

4. The method of claim 1, wherein determining that the second device is an anchor device associated with the area comprises:

determining a confidence score that the second device is associated with the area; and determining that the second device is an anchor device for the area when the confidence score exceeds a threshold.

5. The method of claim 1, further comprising:

determining a first confidence score that the second device is associated with the area;

determining a second confidence score that a third device is associated with the area; and determining the area inference based at least in part on an average of the first confidence score and the second confidence score.

6. The method of claim 5, further comprising responsive to a determination that the second device and a third device are within a threshold distance from the first device, determining the area inference based at least in part on the average of the first confidence score and the second confidence score.

7. The method of claim 5, further comprising responsive to a determination that the second device and a third device are within a threshold distance from the first device, determining the area inference based at least in part on the average of the first confidence score and the second confidence score, wherein the average is a weighted average of the confidence score and the second confidence score.

8. The method of claim 1, further comprising:

determining a confidence score that the second device and a third device are associated with the area based on a correlation of a type of the second device to a type of the third device; and determining the area inference based at least in part on the confidence score.

9. A method of determining a location context of a first device, the method comprising:

receiving, at the first device, a wireless signal from a second device;

determining a proximity of the first device to the second device based on the wireless signal;

determining an area inference based on characteristics of the second device and based on the determined proximity of the first device to the second device, wherein the area inference comprises a category of the area;

assigning an area label to the first device based on the area inference;

providing the area label to an application to enhance the performance of the application; and transmitting the area label to a server as part of a request to disambiguate a query.

10. A first device, comprising:

a transceiver configured to receive a wireless signal from a second device;

a processor coupled to the transceiver, the processor configured to:

determine a proximity of the first device to the second device based on the wireless signal;

determine an area inference based on characteristics of the second device and based on the determined proximity of the first device to the second device, wherein the area inference comprises a category of the area, wherein, to determine the area inference, the processor is configured to determine that the second device is an anchor device associated with the area;

assign an area label to the first device based on the area inference; and provide the area label to an application to enhance the performance of the application.

11. The first device of claim 10, wherein the processor is further configured to transmit the area label to the second device.

12. The first device of claim 10, wherein providing the area label to an application comprises transmitting the area label to a third device, wherein the application is executable on the third device.

13. The first device of claim 10, wherein determining that the second device is an anchor device associated with the area comprises:

determining a confidence score that the second device is associated with the area; and determining that the second device is an anchor device for the area when the confidence score exceeds a threshold.

14. The first device of claim 10, further comprising:

determining a first confidence score that the second device is associated with the area;

determining a second confidence score that a third device is associated with the area; and determining the area inference based at least in part on an average of the first confidence score and the second confidence score.

15. The first device of claim 14, further comprising responsive to a determination that the second device and a third device are within a threshold distance from the first device, determining the area inference based at least in part on the average of the first confidence score and the second confidence score.

16. The first device of claim 14, further comprising responsive to a determination that the second device and a third device are within a threshold distance from the first device, determining the area inference based at least in part on the average of the first confidence score and the second confidence score, wherein the average is a weighted average of the confidence score and the second confidence score.

17. The first device of claim 10, further comprising:

determining a confidence score that the second device and a third device are associated with the area based on a correlation of a type of the second device to a type of the third device; and determining the area inference based at least in part on the confidence score.

18. A first device, comprising:

a transceiver configured to receive a wireless signal from a second device;

a processor coupled to the transceiver, the processor configured to:

determine a proximity of the first device to the second device based on the wireless signal;

determine an area inference based on characteristics of the second device and based on the determined proximity of the first device to the second device, wherein the area inference comprises a category of the area;

assign an area label to the first device based on the area inference;

provide the area label to an application to enhance the performance of the application; and transmit the area label to a server as part of a request to disambiguate a query.

19. A first device, comprising:

means for receiving a wireless signal from a second device;

means for determining a proximity of the first device to the second device based on the wireless signal;

means for determining an area inference based on characteristics of the second device and based on the determined proximity of the first device to the second device, wherein the area inference comprises a category of the area, wherein means for determining the area inference comprises means for determining that the second device is an anchor device associated with the area;

means for assigning an area label to the first device based on the area inference; and means for providing the area label to an application to enhance the performance of the application.

20. The first device of claim 19, wherein the means for providing the area label to an application is further configured to transmit the area label to the second device.

21. The first device of claim 19, wherein the means for providing the area label to an application is configured to transmit the area label to a third device, wherein the application is executable on the third device.

22. The first device of claim 19, wherein the means for determining that the second device is an anchor device associated with the area is configured to:

determine a confidence score that the second device is associated with the area; and determine that the second device is an anchor device for the area when the confidence score exceeds a threshold.

23. The first device of claim 19, further comprising:

means for determining a first confidence score that the second device is associated with the area; and means for determining a second confidence score that a third device is associated with the area, wherein the means for determining the area inference is configured to determine the area inference based at least in part on an average of the first confidence score and the second confidence score.

24. The first device of claim 23, wherein the means for determining the area inference is configured to determine the area inference based at least in part on the average of the first confidence score and the second confidence score responsive to a determination that the second device and a third device are within a threshold distance from the first device.

25. The first device of claim 23, wherein the means for determining the area inference is configured to determine the area inference based at least in part on a weighted average of the first confidence score and the second confidence score responsive to a determination that the second device and a third device are within a threshold distance from the first device.

26. The first device of claim 23, further comprising means for determining a confidence score that the second device and a third device are associated with the area based on a correlation of a type of the second device to a type of the third device, wherein the means for determining the area inference is configured to determine the area inference based at least in part on the confidence score.

27. A non-transitory computer-readable medium comprising processor-executable program code, that when executed by a processor, cause the processor to:

receive, at the first device, a wireless signal from a second device;

determine a proximity of the first device to the second device based on the wireless signal;

determine an area inference based on characteristics of the second device and based on the determined proximity of the first device to the second device, wherein the area inference comprises a category of the area, wherein, determining the area inference comprises determining that the second device is an anchor device associated with the area;

assign an area label to the first device based on the area inference; and provide the area label to an application to enhance the performance of the application.

* * * * *